United States Patent [19]

Idogaki et al.

[11] Patent Number: 4,479,068
[45] Date of Patent: Oct. 23, 1984

[54] STEPPING MOTOR DEVICE FOR CHANGING THE POSITION OF A ROTATING BODY

[75] Inventors: Takaharu Idogaki; Hisasi Kawai, both of Aichi; Kyo Hattori; Kazuhiro Sakurai, both of Shizuoka, all of Japan

[73] Assignees: Nippan Soken, Inc., Nishio; Toyota Jidosha Kabushiki Kaisha, Toyota, both of Japan

[21] Appl. No.: 418,528

[22] Filed: Sep. 15, 1982

[30] Foreign Application Priority Data

Sep. 19, 1981 [JP] Japan .................. 56-147002

[51] Int. Cl.$^3$ ............................. H02K 1/06
[52] U.S. Cl. .................. 310/194; 310/162; 310/268
[58] Field of Search ........... 310/162, 163, 164, 172, 310/257, 42, 194; 251/133, 134, 141

[56] References Cited

U.S. PATENT DOCUMENTS

| | | | |
|---|---|---|---|
| 636,087 | 10/1899 | Tower | 310/257 |
| 3,070,974 | 1/1963 | Greenwald | 251/133 |
| 3,479,539 | 11/1969 | Brion | 310/162 |
| 4,021,689 | 5/1977 | Baltrush | 310/41 |
| 4,388,913 | 6/1983 | Grimm et al. | 251/133 |

FOREIGN PATENT DOCUMENTS

| | | | |
|---|---|---|---|
| 2250944 | 6/1975 | France | 251/134 |
| 55-33041 | 3/1980 | Japan | |
| 122472 | 9/1980 | Japan | |

OTHER PUBLICATIONS

Nikkei Electronics Magazine, pp. 68–81, Feb. 5, 1979, published by Nihon Keizal Shinbun K.K.

Primary Examiner—J. D. Miller
Assistant Examiner—D. L. Rebsch
Attorney, Agent, or Firm—Cushman, Darby & Cushman

[57] ABSTRACT

A rotation driving device is constructed from a bobbin, a coil wound on the bobbin, a stator inserted in the bobbin, and a permanent magnet arranged inside the stator. The stator consists of a hollow cylindrical body having a first, second, and third recesses. In accordance with the command electrical signal supplied to the coil, the rotation driving device changes the rotational position of the rotor.

6 Claims, 11 Drawing Figures

STEPPING MOTOR DEVICE FOR CHANGING THE POSITION OF A ROTATING BODY

BACKGROUND OF THE INVENTION

1. Field of the Invention

The present invention relates to a device for changing the rotational position of a rotating body in response to a command electrical signal. The driving device of the present invention is used, for example, for controlling the rotational position of a movable member of a device.

2. Description of Prior Art

In general, an electromagnetic device is used for actuating a movable member of, for example, a valve.

An example of prior art electromagnetic driving device for a valve will be explained with reference to FIG. 1, attached to the present specification. The device of FIG. 1 includes a coil 101, a plunger 102, a spring 103, a valve 104 incorporated with the plunger 102, a seat 105 for the valve, an input port 106 and an output port 107.

When the coil 101 is energized, the plunger 102 is attracted to the leftward direction, and, hence, the valve 104 separates from the seat 105 to place the valve in the released state. When the coil 101 is de-energized, the plunger 102 returns to the rightward direction because of the force of the spring 103, so that the valve 104 comes into close contact with the seat 105, placing the valve in the closed state.

In the device of FIG. 1, the amount of current supplied to the coil 101 to realize the leftward direction motion of the plunger 102 must be great enough to overcome the resilient force of the spring 103. At the same time, the force of the spring 103 must be great enough to realize quick rightward direction motion of the plunger 102 for quick valve closing. However, the leftward direction motion of the plunger 102 for releasing the valve becomes slower as the force of the spring 103 increases. Thus, the speeding-up of the releasing motion of the valve counteracts the speeding-up of the closing motion of the valve, and, hence, the response speed of the valve cannot be increased above a predetermined speed.

Another prior art device, disclosed in Japanese Unexamined patent publication (Kokai) No. 55-33041, published Mar. 8, 1980 consists of an on-off action valve constructed by using two coils, i.e., without using a spring for the restoring motion. This on-off action valve is not satisfactory, however, because two coils are required and because the size of the device is increased because of the increased length of the plunger.

SUMMARY OF THE INVENTION

It is the object of the present invention to provide an improved electromagnetic device of the uni-directional rotation type which has a high-speed response characteristic, requires only small power consumption, and dispenses with the use of a restoring spring.

In the embodiment of the present invention, use is made of the driving motion of a type of electromagnetic stepping motor. This driving motion is disclosed in, for example, the following publications.

(1) Technical Magazine "Nikkei Electronics" pages 68 to 81, Feb. 5, 1979, published by Nihon Keizai Shinbun K.K.

(2) Japanese Unexamined patent publication No. 55-122472, published Sept. 20, 1980.

According to the present invention there is provided a driving device for changing the rotational position of a rotating body in response to a command electrical signal. The device comprises: a bobbin having a central cylindrical cavity, a coil wound on the bobbin, a stator inserted in the central cylindrical cavity of the bobbin, the stator consisting of a hollow cylindrical body having first recesses formed in the upper and the lower portions, respectively, second recesses formed symmetrically in the middle portion of the hollow cylindrical body for providing a predetermined distribution of the lines of magnetic force line in the space of the hollow cylindrical body, third recesses formed symmetrically in the middle portion of the hollow cylindrical body for changing the magnetically stable position, and a rotor made of a magnet arranged at the center of the space in the hollow cylindrical body.

DESCRIPTION OF THE PREFERRED EMBODIMENT

Figure 1:
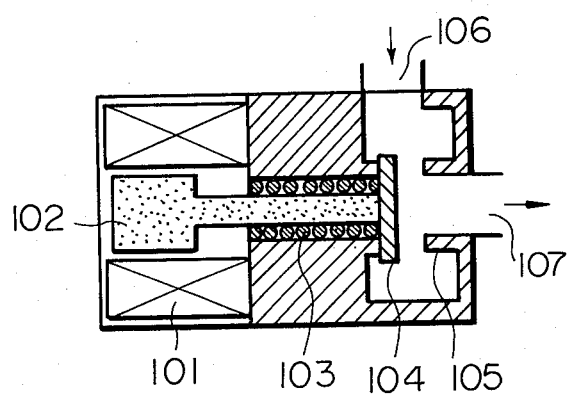
FIG. 1 illustrates a prior art electromagnetic device for a valve, as described hereinbefore.
Figure 2:
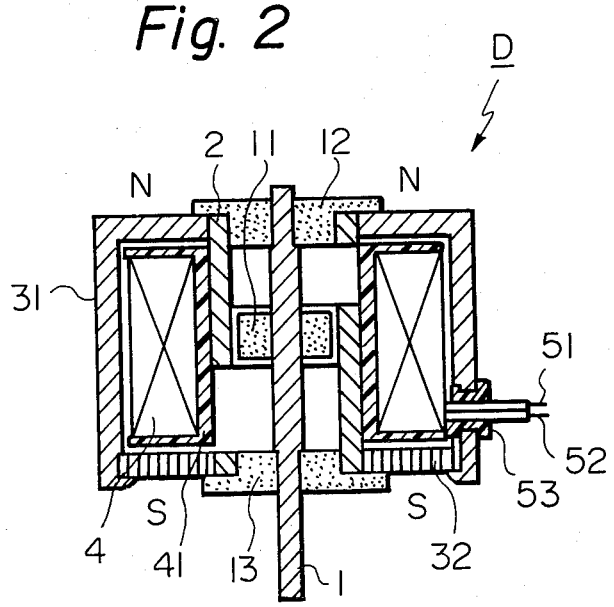
FIG. 2 illustrates a rotation driving device according to an embodiment of the present invention.

A rotation device D according to an embodiment of the present invention is illustrated in FIG. 2. The device of FIG. 2 has a housing 31 made of plated iron, a stator 2 of magnetic material pressed into and fixed to the housing 31, a coil bobbin 41 surrounding the stator 2, and a coil 4 wound on the coil bobbin 41. A nickel-cobalt magnet 11 is fixed to the middle portion of a shaft 1 with adhesive material. The diameter of both end portions of the shaft 1 is approximately 0.5 mm less than the diameter of the middle portion of the shaft 1.

One end of the shaft 1 is supported by a bearing 12, while the other end is supported by a bearing 13. The bearings 12 and 13 are inserted with slight pressure into both ends of the stator 2. The end plate 32 is inserted into the portion of the housing 31 with a slightly enlarged inner diameter and is held by the end portion of the housing 31 by caulking. A rubber grommet 53 holds lead wires 51 and 52 connected to the beginning and the end of the coil 4, respectively.

Figure 3:
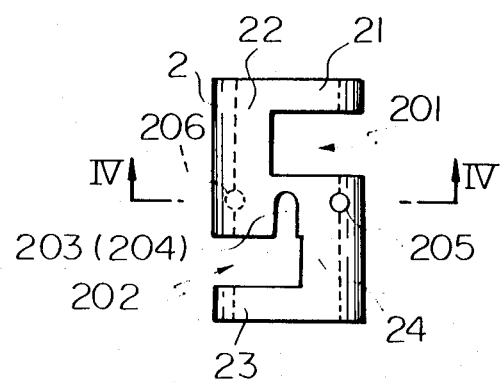
FIG. 3 illustrates a structure of the stator used in the rotation driving device of FIG. 2.
Figure 4:
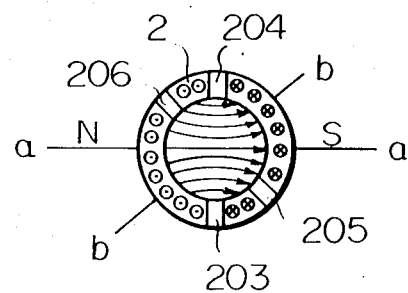
FIG. 4 is a cross-sectional view along line IV—IV of FIG. 3.

The structure of the stator 2 is illustrated in FIG. 3. A cross-sectional view along line IV—IV of FIG. 3 is illustrated in FIG. 4. First recesses 201 and 202 of a semicircular shape are formed in the upper right portion and in the lower portion of the hollow cylindrical pipe body of the stator 2. In order to increase the reluctance, second recesses 203 and 204 are formed at opposite positions, which are located at positions different by 180° in angle, in the middle portion of the stator 2. The second recesses 203 and 204 communicate with the lower first recess 202. Third recesses 205 and 206 in the form of through holes are formed at 45°-left positions in angle with respect to the positions of the second recesses 203 and 204.

Figure 5:
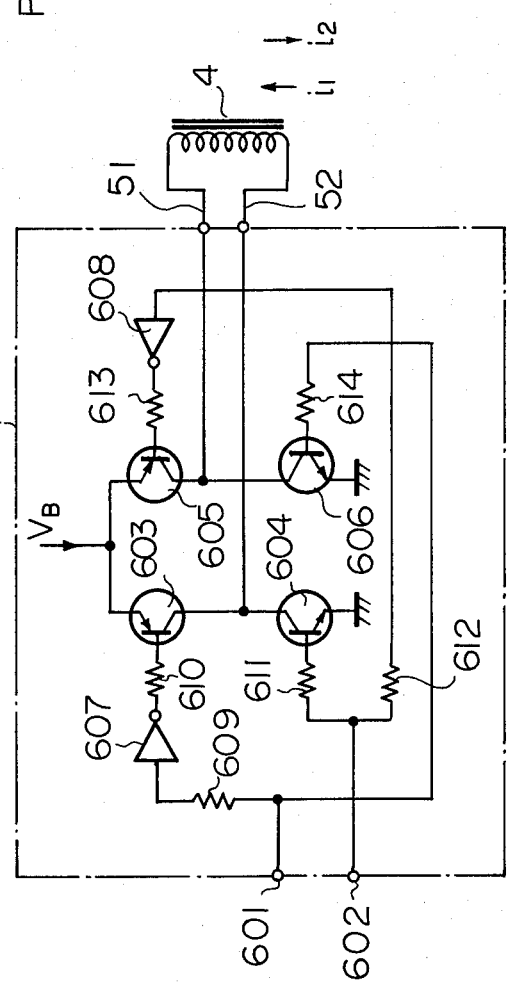
FIG. 5 illustrates the driving circuit for the rotation driving device of FIG. 2.

The driving circuit 6 for the device of FIG. 2 is illustrated in FIG. 5. The circuit of FIG. 5 has input terminals 601, 602, PNP transistors 603 and 605, NPN transistors 604 and 606, inverters 607, 608, and resistors 609, 610, 611, 612, 613, and 614. The source voltage $V_B$ is supplied to the emitters of the transistors 603 and 605. The pulse $P_1$ having a predetermined duration T is supplied to the input terminal 601. The pulse $P_2$ having a predetermined duration T is supplied to the input terminal 602. The pulse $P_1$ does not overlap the pulse $P_2$. The output lines 51 and 52 are connected to both terminals of the coil 4.

Figure 6:
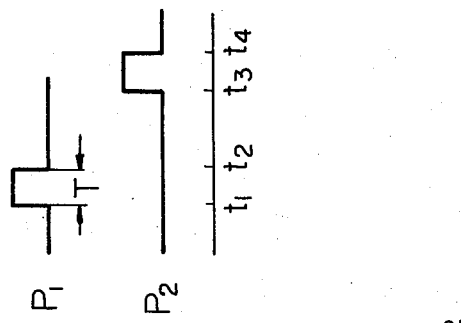
FIG. 6 illustrates the waveforms of the signals supplied to the driving circuit of FIG. 5.

The operation of the driving circuit 6 will now be explained. When the pulse $P_1$ having a predetermined duration T (FIG. 6) is supplied to the input terminal 601, the output potential of the inverter 607 becomes LOW, and, hence, the PNP transistor 603 turns ON. For the same time, the NPN transistor 606 turns ON. Since the transistors 605 and 604 are in the OFF state, the current $i_1$ passes through the coil 4.

When the pulse $P_2$ having a predetermined duration T (FIG. 6) is supplied to the input terminal 602, the output potential of the inverter 608 becomes LOW, and, hence, the PNP transistor 605 turns ON. For the same time, the NPN transistor 604 turns ON. Since the transistors 603 and 606 are in the OFF state, the current $i_2$ passes through the coil 4.

The distribution of the lines of magnetic force in the device of FIG. 2 when current passes through the coil 4 via the lines 51 and 52 will now be explained. It is assumed the current $i_1$ of FIG. 5 passes through the coil 4. When the coil 4 is thus excited, the N pole is formed at the top side and the S pole is formed at the bottom side of the coil 4. The magnetic force lines pass through the outside housing 31 and the inside stator 2.

Accordingly, in the stator 2 (FIG. 3), the lines of magnetic force pass from the portion 21 to the portion 23. Since there are the second recesses 203 and 204, the distribution of the lines of magnetic force in the space of the hollow cylindrical body of the stator 2 is formed as illustrated in FIG. 4. Thus, in the line IV—IV of FIG. 3, the N pole is formed at the left side and the S pole is formed at the right side. The lines of magnetic force pass through the portion 24 and the end plate 32 to the S pole of the coil 4.

Contrary to this, if the current $i_2$ of FIG. 5 passes through the coil 4, the S pole is formed at the left side and the N pole is formed at the right side.

The third recesses 205 and 206 are provided in order to change the magnetically stable position from line a—a to line b—b of FIG. 4 when the current of the coil 4 is stopped.

The shape of the cross-section of the stator 2 along line IV—IV of FIG. 3 is symmetrical with respect to line b—b of FIG. 4. Hence, when the current of the coil 4 is stopped, the magnetic flux of the magnet 11 tends to pass the symmetrical left and right paths for the magnetic flux. Accordingly, the N-S axis of the magnet 11 comes to coincide with line b—b of FIG. 4.

Figure 7:
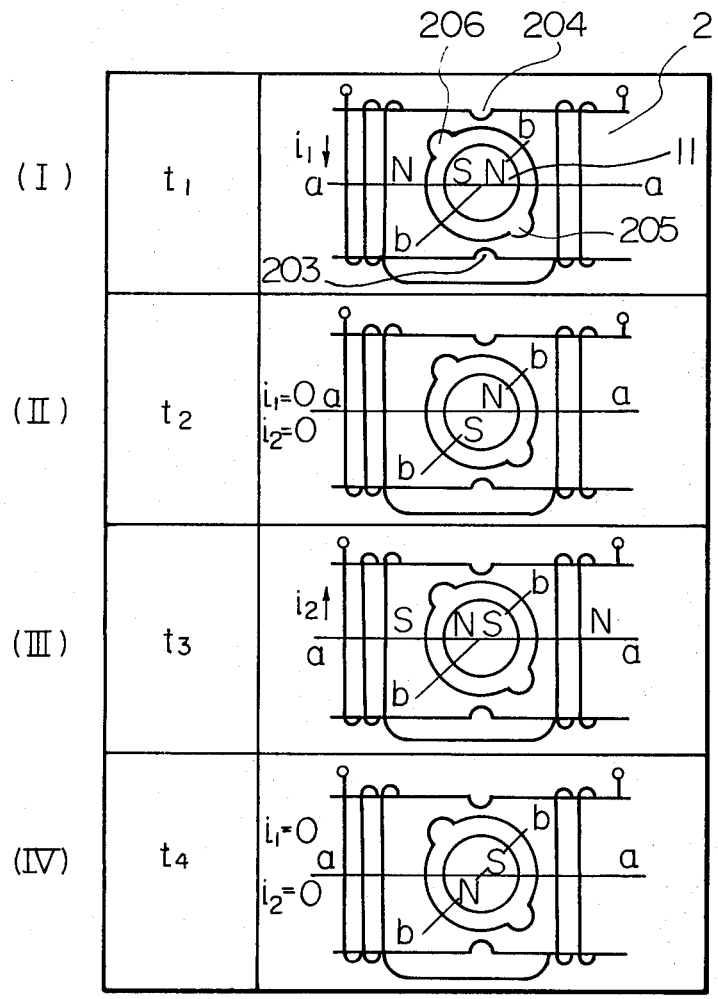
FIG. 7 illustrates the principle of the operation of the device of FIG. 2.

The principle of the operation of the device of FIG. 2 will be explained with reference to FIG. 7. The stator 2 and the magnet 11 in FIG. 7 correspond to the stator 2 and the magnet 11 in FIG. 2, respectively. The recesses 203 and 204 in FIG. 7 correspond to the second recesses 203 and 204 in FIG. 3, respectively. The recesses 205 and 206 in FIG. 7 correspond to the third recesses 205 and 206 in FIG. 3, respectively. Lines a—a and b—b representing the magnetically stable position in FIG. 7 correspond to lines a—a and b—b representing the magnetically stable position in FIG. 4, respectively.

(I) At the instant $t_1$, the pulse $P_1$ is supplied to the input terminal 601 of the driving circuit 6 (FIG. 5) to cause the current $i_1$. The N pole is formed at the left side and the S pole is formed at the right side of the stator, and, hence, the S pole and the N pole of the magnet 11 are attracted to the N pole and the S pole of the stator, respectively, so that the magnet 11 takes the position as illustrated in FIG. 7, (I).

(II) At the instant $t_2$, the pulse $P_1$ is removed from the input terminal 601 of the driving circuit 6 (FIG. 5). Then, no current passes through the coil 4, and, hence, no magnetic field is generated. Accordingly, the magnet 11 is rotated so that the N-S line of the magnet 11 becomes coincident with the line b—b representing the magnetically stable position. In this case, the magnet 11 rotates in the counterclockwise direction because of the existence of the line b—b representing the magnetically stable position.

(III) At the instant $t_3$, the pulse $P_2$ is supplied to the input terminal 602 of the driving circuit 6 (FIG. 5) to cause the current $i_2$. The S pole is formed at the left side and the N pole is formed at the right side of the stator, and, hence, the N pole and the S pole of the magnet 11 are attracted to the S pole and the N pole of the stator, respectively, so that the magnet 11 takes the position as illustrated in FIG. 7, (III). In this case, the magnet 11 rotates in the counterclockwise direction.

(IV) At the instant $t_4$, the pulse $P_2$ is removed from the input terminal 602 of the driving circuit 6 (FIG. 5). Then, no current passes through the coil 4, and, hence, no magnetic field is generated. Accordingly, the magnet 11 is rotated so that the N-S line of the magnet 11 becomes coincident with the line b—b representing the magnetically stable position. After that, if the pulse $P_1$ is supplied to the input terminal 601, the magnet 11 rotates in the counterclockwise direction to take again the position of FIG. 7, (I).

Figure 8:
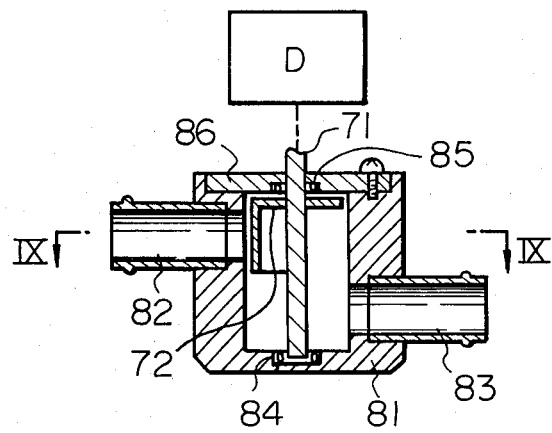
FIG. 8 illustrates a device for controlling a valve using the rotation driving device of FIG. 2.
Figure 9:
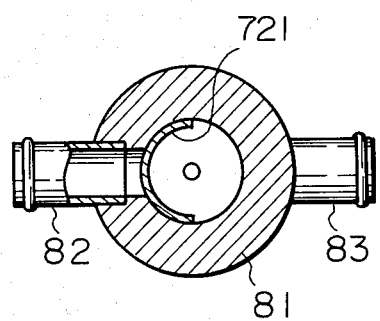
FIG. 9 is a cross-sectional view along line IX—IX of FIG. 8.
Figure 10:
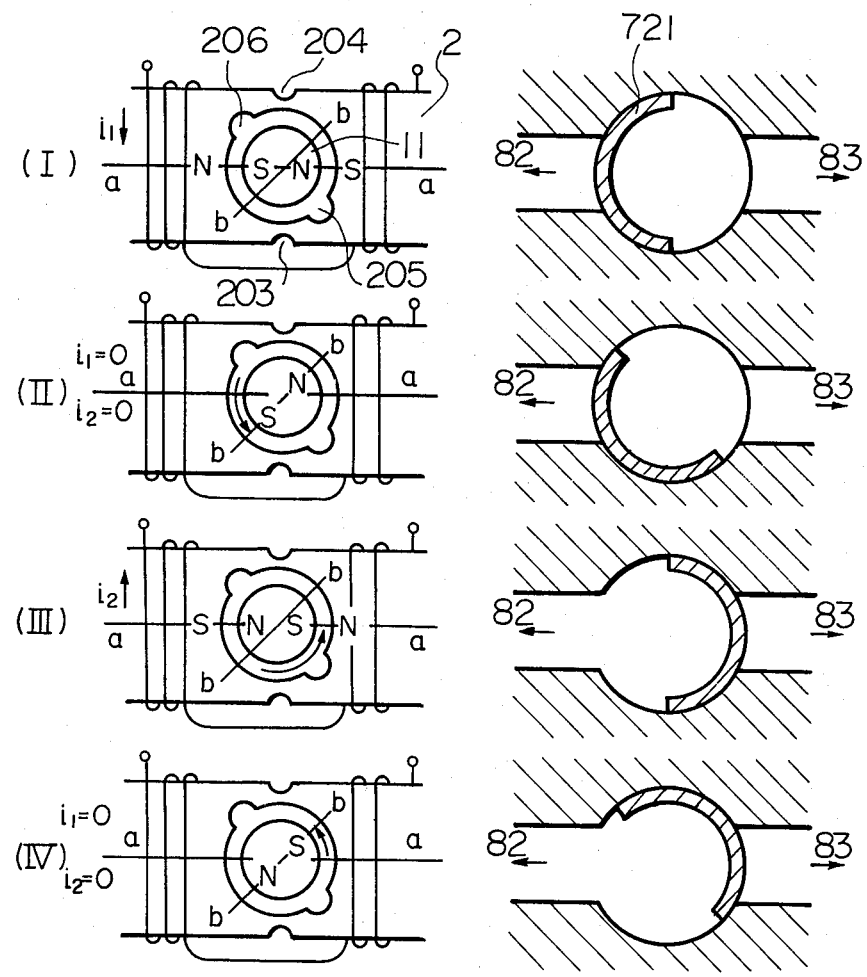
FIG. 10 illustrates the change of the position of the valve rotor of the device of FIG. 8.

A device for controlling a valve using the rotation driving device D of FIG. 2 is illustrated in FIGS. 8, 9, and 10. The device for controlling the valve includes pipes 82 and 83 which are coupled to openings of valve housing 81. The pipe 82 is connected to an air pump (not shown), while the pipe 83 is connected to an exhaust system of an engine. A rotor 72 in the cavity in the valve housing 81 is fixed to the end of the shaft 71 which is coupled directly to the shaft 1 of the rotation driving device D. A shield 721 of a semicircular shape is provided in the rotor 72. The device for controlling the valve also provides bearings 84 and 85 for supporting the shaft 71 and a cover 86. The pipe 83 is maintained to communicate always with the cavity in the valve housing 81.

The change of the position of the valve rotor 72 of the device of FIG. 8 for controlling the valve, corresponding to the change of the position of the magnet 11, is illustrated in FIG. 10. The states (I), (II), (III), and (IV) of FIG. 10 correspond to the states (I), (II), (III), and (IV) of FIG. 7, respectively. The operation is as follows.

(I) When the pulse $P_1$ is supplied to the input terminal 601 of the driving circuit 6 (FIG. 5) to cause the current $i_1$, the upper opening of the valve housing 81 coupled to the pipe 82 is closed by the rotor shield 721.

(II) When the pulse $P_1$ is removed from the input terminal 601, the rotor shield 721 rotates up to the position illustrated in FIG. 10, (II) so that the closing of the upper opening of the valve housing 81 is maintained.

(III) When the pulse $P_2$ is supplied to the input terminal 602 of the driving circuit 6 (FIG. 5), the rotor shield 721 rotates up to the position illustrated in FIG. 10 (III) so that the upper opening of the valve housing 81 is released from the closing by the rotor shield 721 and, accordingly, the passage between the pipe 82 and the pipe 83 is established.

(IV) When the pulse $P_2$ is removed from the input terminal 602, the rotor shield 721 rotates up to the position illustrated in FIG. 10, (IV) so that the passage between the pipe 82 and the pipe 83 is maintained.

Figure 11:
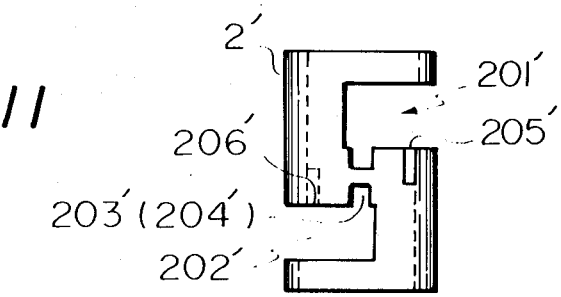
FIG. 11 illustrates another example of the structure of the stator used in the rotation driving device of FIG. 2.

Although a preferred embodiment of the present invention is described heretofore, it will be understood that various modifications and alterations are possible without departing from the scope of the present invention. For example, the stator 2 of FIG. 3 can also be constructed as another structure 2' illustrated in FIG. 11. The second recesses 203' and 204' and the third recesses 205' and 206' are arranged in a manner different from those in FIG. 3.

We claim:

1. A stepping motor device for changing the rotational position of a rotating body in response to a command electrical signal, said device comprising:
a bobbin having a central cylindrical cavity,
a coil wound on said bobbin,
a stator inserted in said central cylindrical cavity of the bobbin, said stator consisting of a hollow cylindrical body having first recesses formed in the upper and the lower portions, respectively, one of said first recesses in the upper portion being located in the side opposite to the side of the other of said first recesses in the lower portion with respect to the axis of said hollow cylindrical body, the portion of said hollow cylindrical body between said first and second recesses being a main cylinder having a circumferential structure, second recesses formed symmetrically of said main cylinder for providing a predetermined distribution of the lines of magnetic force in the space of said hollow cylindrical body, and third recesses formed symmetrically in the middle portion of said hollow cylindrical body for changing the magnetically stable position, and
a cylindrical permanent magnet rotor arranged at the center of the space in said hollow cylindrical body, said magnet having an axial length equal to or less than the axial length of said main cylinder.

2. A device as defined in claim 1, wherein said hollow cylindrical body of the stator has first recesses of a semicircular shape formed in the upper right portion and in the lower left portion of said hollow cylindrical body, second recesses formed at opposite positions, which are located at positions different by 180° in angle, in the middle portion of said hollow cylindrical body, said second recesses communicating with said lower left first recess, and third recesses in the form of through holes at opposite positions, which are located at positions different by 180° in angle, in the middle portion of said hollow cylindrical body, shifted from the positions of said second recesses by a predetermined angle.

3. A device as defined in claim 1, wherein said hollow cylindrical body of the stator has first recesses of a semicircular shape formed in the upper right portion and in the lower left portion of said hollow cylindrical body, second recesses formed at opposite positions, which are located at positions different by 180° in angle, in the middle portion of said hollow cylindrical body, said second recesses communicating with said upper right first recess and said lower left first recess, respectively, and third recesses formed at opposite positions, which are located at positions different by 180° in angle, in the middle portion of said hollow cylindrical body, shifted from the positions of said second recesses by a predetermined angle, said third recesses communicating with said upper right first recess and said lower left first recess, respectively.

4. A device as defined in claim 1, wherein the shaft of said rotor is coupled with a shaft of a valve rotor of a valve control device including a valve housing having a cavity with openings connected to pipes, said valve rotor being rotatable in said cavity for controlling the passage between said cavity and one of said pipes.

5. A stepping motor device for changing the rotational position of a rotating body in reponse to a command electrical signal, said device comprising:
a bobbin having a central cylindrical cavity;
a coil wound on said bobbin;
a stator inserted in said central cylindrical cavity of the bobbin, said stator consisting of a hollow cylindrical body having first recesses of a semicircular shape formed in the upper and lower portions, respectively, one of said first recesses in the upper portion being located in the side opposite to the side of the other of said first recesses in the lower portion with respect to the axis of said hollow cylindrical body, so that said first recesses are formed at opposite positions which are located at positions different by 180° in angle, second recesses formed symmetrically in the middle of said hollow cylindrical body for providing a predetermined distribution of the lines of magnetic force in the space of said hollow cylindrical body, said second recesses communicating with said lower first recess, and third recesses formed symmetrically in the middle portion of said hollow cylindrical body for changing the magnetically stable position, said third recesses being in the form of through holes which are located at positions different by 180° in angle, in the middle portion of said hollow cylindrical body, shifted from the position of said second recesses by a predetermined angle; and
a cylindrical permanent magnet rotor arranged at the center of the space in said hollow cylindrical body.

6. A stepping motor device for changing the rotational position of a rotating body in response to a command electrical signal, said device comprising:
a bobbin having a central cylindrical cavity;
a coil wound on said bobbin;
a stator inserted in said central cylindrical cavity of the bobbin, said stator consisting of a hollow cylindrical body having first recesses of a semicircular shape formed in the upper and the lower portions, respectively, one of said first recesses in the upper portion being located in the side opposite to the side of the other of said first recesses in the lower portion with respect to the axis of said hollow cylindrical body, second recesses formed symmetrically in the middle portion of said hollow cylindrical body for providing a predetermined distribution of the lines of magnetic force in the space of said hollow cylindrical body, said second recesses being formed at opposite positions, which are located at positions different by 180° in angle and communicating with said upper and said lower first recesses, respectively, and third recesses formed symmetrically in the middle portion of said hollow cylindrical body for changing the magnetically stable position, said third recesses being formed at opposite positions, which are located at positions different by 180° in angle, shifted from the positions of said second recesses by a predetermined angle, said third recesses communicating with said upper and lower left recesses, respectively; and a cylindrical permanent magnet rotor arranged at the center of the space in said hollow cylindrical body.

* * * * *

UNITED STATES PATENT AND TRADEMARK OFFICE
CERTIFICATE OF CORRECTION

PATENT NO.  : 4,479,068
DATED       : October 23, 1984
INVENTOR(S) : IDOGAKI, Takaharu and KAWAI, Hisasi It is certified that error appears in the above-identified patent and that said Letters Patent is hereby corrected as shown below:

On the Title Page
    Item [73]   read "Nippan Soken, Inc." as
               --Nippon Soken, Inc.--

IN THE CLAIMS

Claim 3, column 6, line 19, read "communicatling"
        as --communicating--

Signed and Sealed this

Twenty-eighth Day of May 1985

[SEAL]

Attest:

DONALD J. QUIGG

Attesting Officer      Acting Commissioner of Patents and Trademarks